United States Patent [19]

Nishikawa

[11] 4,253,792

[45] Mar. 3, 1981

[54] PIPE NESTING APPARATUS AND METHOD OF NESTING AND UNNESTING PIPES WITH THE APPARATUS

[75] Inventor: Munehiro Nishikawa, Ichikawa, Japan

[73] Assignee: Kubota, Ltd., Osaka, Japan

[21] Appl. No.: 4,671

[22] Filed: Jan. 19, 1979

[30] Foreign Application Priority Data

Oct. 16, 1978 [GB] United Kingdom ............... 40712/78

[51] Int. Cl.[3] .......................... B65G 7/10; B66F 11/00

[52] U.S. Cl. .................................... 414/589; 138/109; 138/113; 138/114; 206/443; 206/446; 414/431; 414/745; 414/749; 414/786; 414/910

[58] Field of Search ................. 414/30, 433, 589, 590, 414/745, 747, 749, 786, 910, 431; 138/109, 113, 114, 148; 206/303, 443, 446, 505, 519

[56] References Cited

U.S. PATENT DOCUMENTS

| | | | |
|---|---|---|---|
| 1,195,147 | 8/1916 | Mitchell | 414/910 X |
| 1,583,486 | 5/1926 | Paige | 414/745 |
| 2,417,678 | 3/1947 | Cox | 414/433 |
| 2,423,986 | 7/1947 | Lathrope | 138/113 X |
| 2,752,056 | 6/1956 | Lull | 414/910 X |
| 3,908,845 | 9/1975 | Bolt | 414/745 |
| 4,143,774 | 3/1979 | Poulsen | 414/745 |

*Primary Examiner*—Leslie J. Paperner
*Attorney, Agent, or Firm*—Joseph W. Farley

[57] ABSTRACT

An apparatus for and a method of nesting pipes of varying diameters or unnesting the resulting assembly into individual pipes for efficient transport of the pipes. The apparatus comprises a support arm for supporting a pipe with the arm extending therethrough, a support member for supporting the pipe thereon, a lift for raising or lowering one of the support arm and the support member, e.g. the support member, and a carriage movable axially of the pipe and equipped with the above-mentioned one support element, e.g. the liftable support member. By the movement of the carriage, a pipe on one of the support arm and support member is fitted around the other or around another pipe thereon, or nested pipes are separated. In the above-mentioned example, a pipe on the support member is fitted around the support arm or another pipe thereon.

26 Claims, 22 Drawing Figures

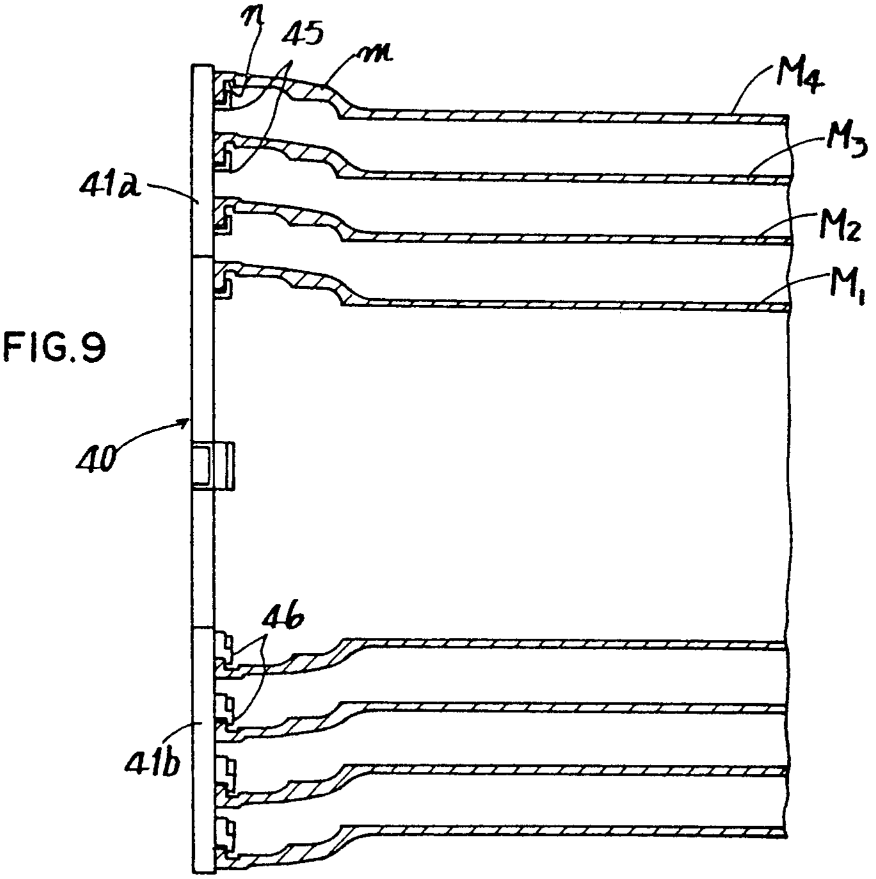
FIG.9
FIG.11
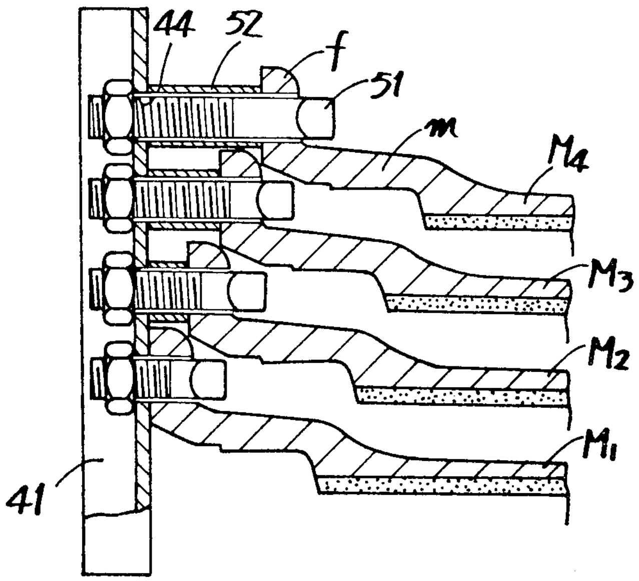
FIG.10
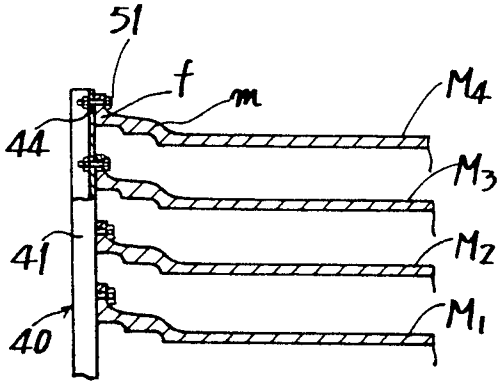

PIPE NESTING APPARATUS AND METHOD OF NESTING AND UNNESTING PIPES WITH THE APPARATUS

This invention relates to an apparatus for nesting and unnesting pipes with use of the apparatus.

When nested, pipes of varying diameters can be transported economically since one or more pipes of small diameter are transportable with a pipe of large diameter in which the small pipes are fitted. This method of transport is very advantageous also because the small-diameter pipes act to reinforce the large-diameter pipe against deformation during transport.

Conventionally pipes are nested by pushing a pipe of small diameter into a pipe of larger diameter in sliding contact with the inner surface of the latter. It is also attempted to render the small-diameter pipe smoothly insertable into the large-diameter pipe with a roller or slider provided therebetween. However, either of these methods involves sliding movement of the small pipe on the inner surface of the large pipe, thus entailing the problem that the small pipe will damage the mortar lining or seal coating on the pipe inner surface to reduce the function of the pipe.

The main object of this invention is to provide a pipe nesting apparatus by which pipes can be nested efficiently without the likelihood of damaging the inner surface of the pipe.

In order to fulfill this object, the present invention provides a pipe nesting apparatus comprising a support arm for supporting a pipe with the arm extending through the pipe, a support member for supporting the pipe thereon, lift means for raising or lowering one of the support arm and the support member, and carriage means equipped with one of the support arm and the support member for moving said one support element axially of the pipe between a first position in which the support arm is located above the support member and a second position in which the support arm and the support member are located away from each other.

According to the present invention, the support arm is fixedly mounted on a support frame and the support member is mounted on the carriage means by the lift means, or alternatively the support arm is mounted on the carriage means by the lift means and the support member comprises a stationary support base.

With the former embodiment, pipes are nested by moving the carriage means with a pipe of small diameter placed on the support member to fit the pipe around the support arm, lowering the support member to cause the arm to support the small-diameter pipe thereon, moving the carriage means with a pipe of larger diameter subsequently placed on the support member to fit the large-diameter pipe around the small-diameter pipe and fix the two pipes to each other by means for spacing the pipes apart from each other, repeating the above steps a required number of times, raising the support member to support the resulting fixed assembly of pipes on the carriage means, and moving the carriage means away from the position of the support arm.

With the latter embodiment, pipes are nested by placing a pipe of small diameter to be inserted into a pipe of larger diameter in a position between a first position and a second position of the carriage means on the path of travel thereof, moving the carriage means to insert the support arm into the small-diameter pipe, raising the support arm to support the small-diameter pipe thereon, subsequently moving the carriage means to insert the small-diameter pipe into the pipe of larger diameter on the support base, fixing the two pipes to each other by means for spacing the pipes apart from each other, and repeating the above steps a plurality of times as required.

The assembly of pipes can be separated into individual pipes by performing the foregoing steps generally in the reverse order.

Various other features and advantages of the invention will become more apparent in detail from the description of embodiments of the invention given with reference to the accompanying drawings.

DESCRIPTION OF THE DRAWINGS

FIG. 9 is a fragmentary enlarged view in section of FIG. 8;

FIG. 10 is a fragmentary view in section showing pipes of different kind as nested with a modified holder;

FIG. 11 is an enlarged sectional view similar to FIG. 10, in which another modified holder is used;

DESCRIPTION OF THE PREFERRED EMBODIMENTS

Figure 1:
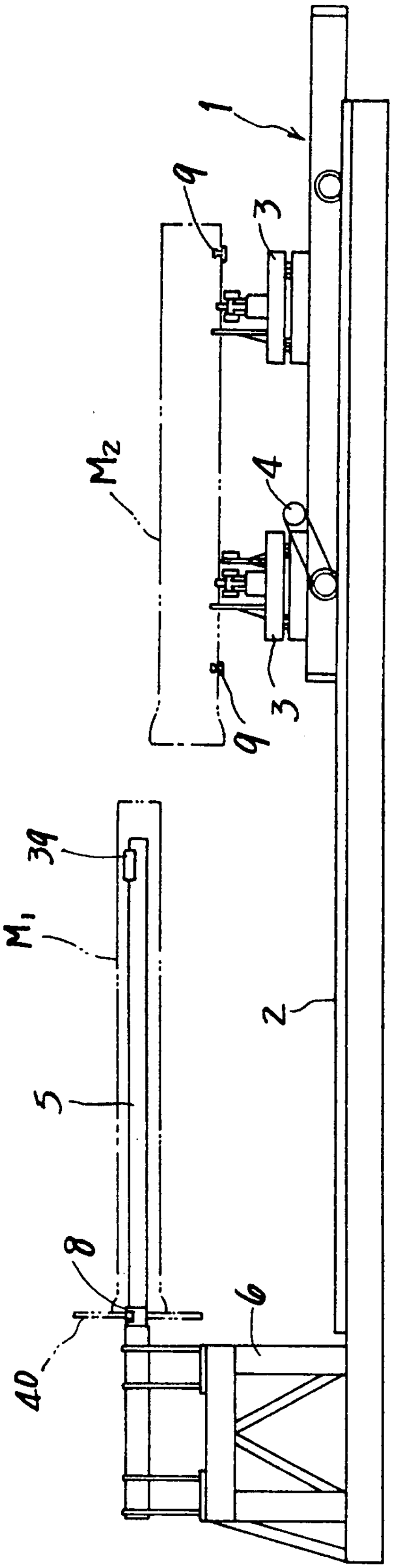
FIG. 1 is a front view showing a first embodiment of the nesting apparatus according to the present invention.

With reference to FIG. 1, a carriage 1 movable on guide rails 2 is provided with pipe support means 3 for vertically movably supporting pipes $M_1$ to $M_4$ and with propelling means 4. Above the path of travel of the carriage 1, namely above one end of each rail 2, there is provided a support arm 5 extending horizontally along the guide rails 2 for supporting pipes $M_1$ to $M_4$. The support arm 5 is made of a round bar or hollow cylinder and fixed to a support frame 6 in a cantilever fashion.

The support arm 5 is provided, at an upper half portion close to its fixed end, with cradles 8 for detachably supporting a holder 40 for fixedly holding pipes $M_1$ to $M_4$ each at one end thereof and spaced apart from one another. The support arm 5 is also provided, at an upper half portion close to its free end, with a cradle 39 made of elastic material and in the form of a semicircular split hollow cylinder.

Arranged on one side of and above the other ends of the guide rails 2 are transfer rails 9 extending at right angles to the guide rails 2 for transferring pipes $M_1$ to $M_4$ onto the carriage 1.

Figure 2:
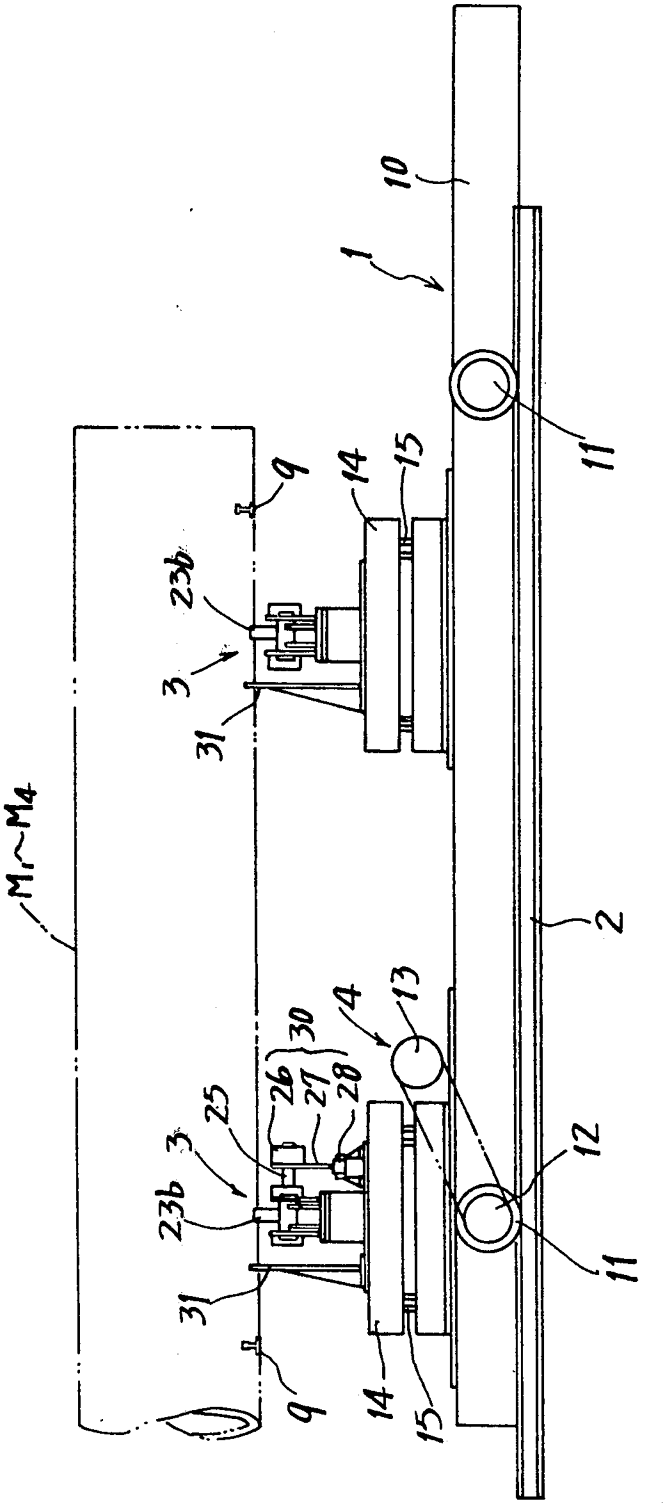
FIG. 2 is a front view showing a carriage.
Figure 3:
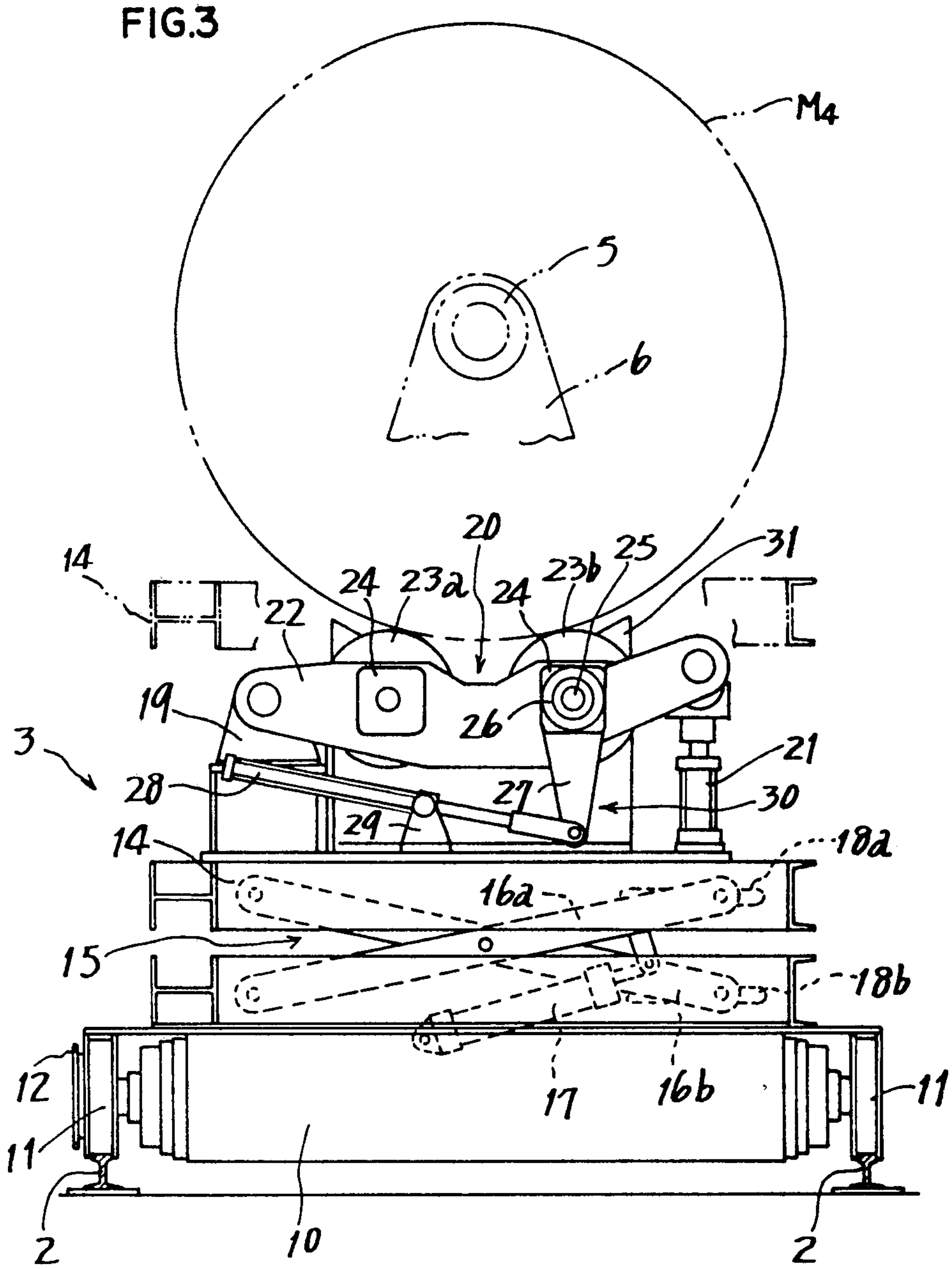
FIG. 3 is an enlarged side elevation of FIG. 2.

As seen in FIGS. 2 and 3, the carriage 1 comprises a main body 10 provided with wheels 11. The propelling means 4 comprises a hydraulic motor 13 coupled to one of the wheels 11 by a sprocket 12 and a chain. Front and rear liftable frames 14 are mounted on the top of the carriage main body 10 by lift means 15 at two locations.

Each of the lift means 15 comprises a pair of links 16*a*, 16*b* interconnected crosswise, and cylinder means 17 for moving the link 16*a*. The two links 16*a*, 16*b* are pivoted, each at its one end, to the liftable frame 14 and to the carriage main body 10. The other ends of the links are engaged in slots 18*a* and 18*b* in the frame 14 and the carriage main body 10 respectively.

At one side of the main body 10, the liftable frame 14 carries a bracket 19 supporting a pivotable frame 20 at its one end. The frame 20 is pivotably movable about a horizontal axis along the direction of travel of the carriage 1. The pivotable frame 20 is also pivoted at the other end thereof to the top end of the piston rod of cylinder means 21 pivoted to the liftable frame 14 and serving as means for effecting pivotal movement. The pivotable frame 20 is made up of a pair of parallel plates 22, between which a pair of pipe support rollers 23*a*, 23*b* are disposed and are spaced apart from each other transversely of the carriage main body 10. The support rollers 23*a*, 23*b* are mounted by bearings 24 on the plates 22. A rotary shaft 25 secured to the support roller 23*b* of the pair has one end projecting from the bearing 24 and carrying a one-way clutch 26 and a turn lever 27 for turning the rotary shaft 25 by way of the clutch 26. The clutch may comprise a ratchet mechanism or the like. The turn lever 27 is pivoted to the piston rod of cylinder means 28, which is supported in a seesaw fashion by a bracket 29 on the liftable frame 14. The cylinder means 28, one-way clutch 26, etc. constitute drive means 30 for the support roller 23*b*.

The pipe support means 3 comprises the liftable frame 14, pivotable frame 20, support rollers 23*a*, 23*b* etc. An upright guide member 31 having a V-shaped notch for guiding pipes onto the rollers 23*a*, 23*b* is mounted on the liftable frame 14 on one side of the pivotable frame 20.

Figure 4:
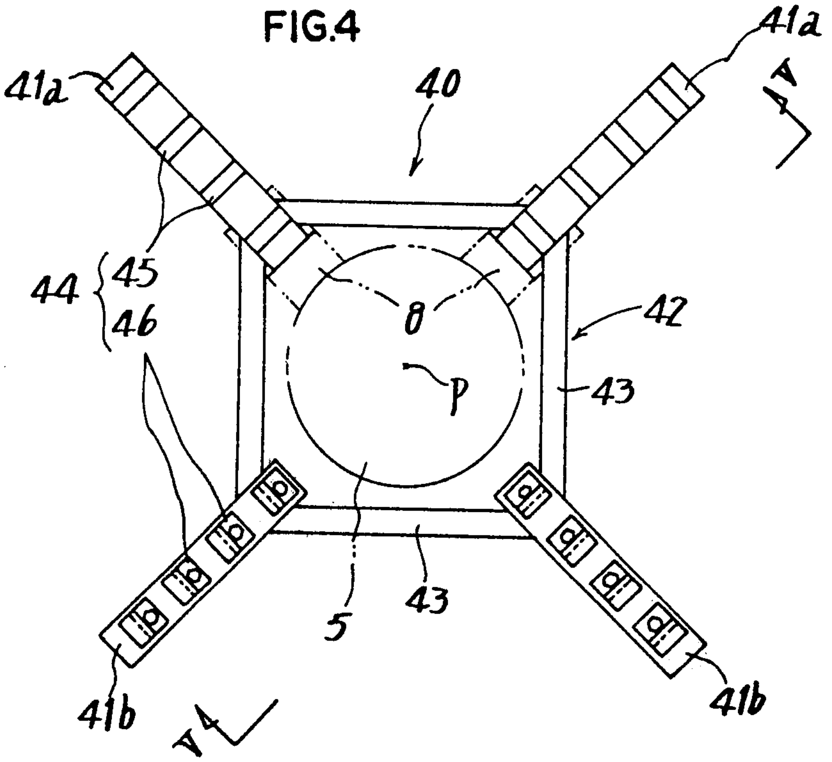
FIG. 4 is a front view of a holder.
Figure 5:
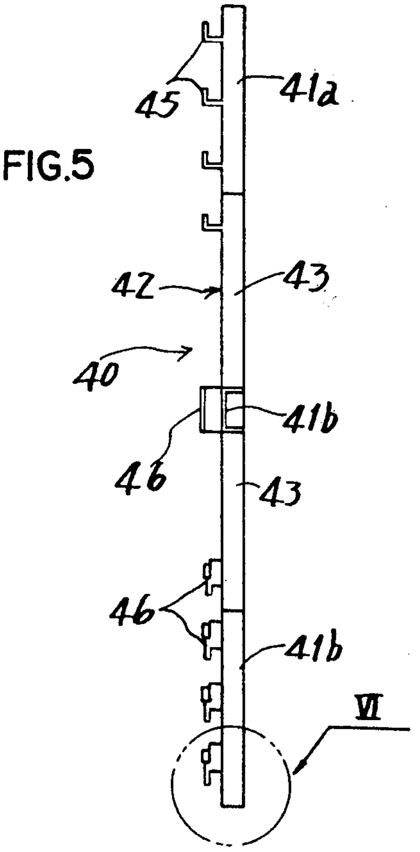
FIG. 5 is a view of the holder as it is seen in the direction of arrows V—V of FIG. 4.
Figure 6:
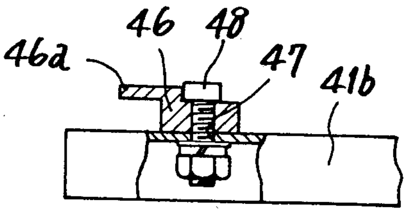
FIG. 6 is an enlarged view partly in section and showing the portion indicated by the arrow VI in FIG. 5.

FIGS. 4 to 6 show the aforementioned pipe holder 40 in greater detail. The holder 40 comprises four bars 41*a*, 41*b* in radial arrangement, connecting members 43 interconnecting and welded to the bars 41*a*, 41*b* to define a square annular frame 42 and a plurality of engaging portions 44 mounted on each of the bars 41*a*, 41*b* and arranged longitudinally thereof. The bars 41*a*, 41*b* and connecting members 43 each comprise a channel member. The radially inner ends of the bars 41*a*, 41*b* are positioned away from the center P of the radial arrangement. The support arm 5 is positionable within the space defined by the inner ends and the annular frame 42.

The engaging portions 44 are positioned on concentric circles centered around the center P. Each of the engaging portions 44 on the two adjacent bars 41*a* comprises an L-shaped fixed engaging member 45 which is secured to the bar 41*a* with its forward end directed toward the outer end of the bar 41*a*. Each of the engaging portions 44 on the other bars 41*b* comprises an engaging member 46 detachably attached to the bar 41*b* by a nut and a bolt 48 extending through a hole 47. The engaging member 46 has a projection 46*a* which extends toward the outer end of the bar 41*b* when the member is mounted in position.

Figure 7:
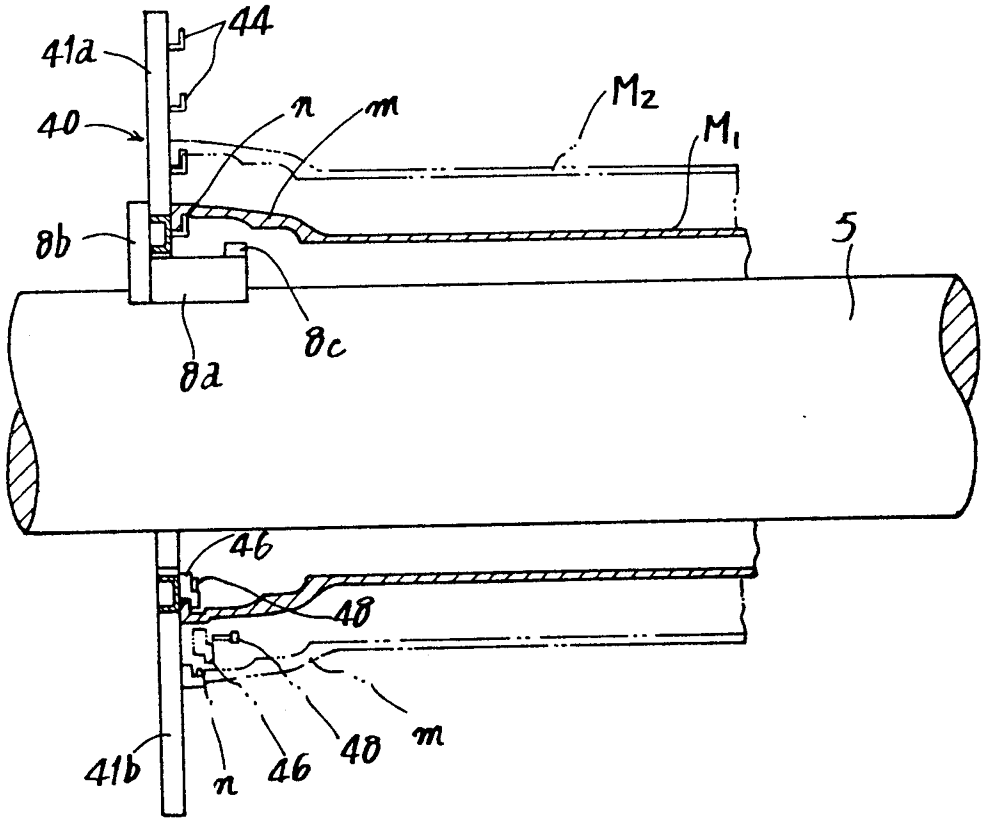
FIG. 7 is a front view partly broken away and showing the holder as it is mounted on a support arm.
Figure 8:
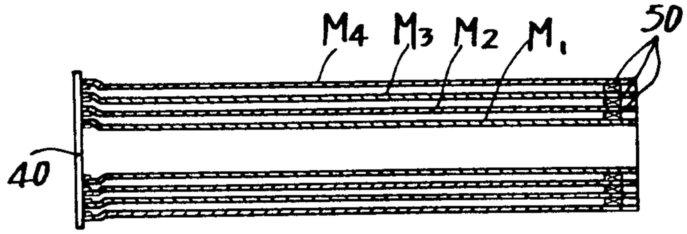
FIG. 8 is a view in section showing nested pipes.

The cradles 8 for fixedly supporting the holder 40 on the support arm 5 are arranged at positions shifted from the top end of the support arm 5 downward toward its opposite sides through 45° angularly about the center P as seen in FIG. 4. As shown in FIG. 7, the cradle 8 comprises a main body 8*a* in contact with the inner end face of the bar 41*a* of the holder 40 and a positioning stopper 8*b* projecting from one end of the main body 8*a* and in contact with the front face of the bar 41*a*. When desired, the main body 8*a* may be provided at the other end thereof with another stopper 8*c* for restraining the holder 40 during unnesting procedure.

The apparatus will be used in the following manner, for example, when nesting pipes $M_1$ to $M_4$ in a quadruple arrangement. A multiplicity of pipes $M_1$ to $M_4$ to be nested are first placed on the transfer rails 9 with those of smaller diameter in each group positioned closer to the guide rails 2. Each of the pipes $M_1$ to $M_4$ has a socket end m formed in its inner surface with an annular groove n for a sealing member to engage in as shown in FIGS. 7 and 9. The pipes are placed on the transfer rails 9 with the socket ends m directed toward the support arm 5. Subsequently the pipe $M_1$ of the smallest diameter is transferred from the rails 9 onto the support rollers 23*a*, 23*b* on the carriage 1 by being rolled. At this time, the pipe $M_1$ is guided onto the support rollers 23*a*, 23*b* by the guide members 31. Alternatively, the pipe may be placed directly onto the support rollers 23*a*, 23*b* with a forklift or the like instead of using the transfer rails 9.

The holder 40 is then attached to the socket end m of the pipe $M_1$ by fitting the radially innermost fixed engaging member 45 on each bar 41*a* into the groove n of the socket end m, fitting the detached engaging members 46 to be attached to the innermost positions of the bars 41*b* into the groove n, and securing the members 46 to the bars 41*b* with the bolts and nuts 48.

The liftable frames 14 are thereafter raised to bring the pipe $M_1$ into substantial alignment with the support arm 5, and the carriage 1 is moved to fit the pipe $M_1$ around the support arm 5. When the pipe $M_1$ has reached the specified position on the support arm 5 axially thereof, the liftable frames 14 are lowered, whereby the bars 41*a* having fixed engaging members 45 on the holder 40 are placed on the cradles 8, causing the support arm 5 to support the pipe $M_1$ at its one end by the cradles 8. The other end of the pipe $M_1$ is similarly supported by the cradle 39 on the forward end of the support arm. As a result the pipe $M_1$ is held in its horizontal position. If the bars 41*a* of the holder 40 are found angularly out of coincidence with the cradles 8 when or before placing the pipe $M_1$ onto the support arm 5, the support roller 23*b* is rotated by the cylinder means 28 to rotate the pipe $M_1$ and to thereby bring the bars 41*a* in position. If the pipe $M_1$ is out of alignment with the support arm 5, for example because the pipe is oval in cross section, the pivotable frame 20 is moved by the cylinder means 21 to ensure alignment.

The holder 40 can be mounted on the cradles 8 before the pipe $M_1$ is fitted around the support arm 5.

After the pipe $M_1$ of smallest diameter has been completely supported by the support arm 5, the carriage 1 is retracted, and the pipe $M_2$ of second smallest diameter placed onto the support rollers 23*a*, 23*b* on the carriage 1. The liftable frame 14 is then raised, and the carriage 1 moved to fit the pipe $M_2$ around the preceding pipe $M_1$ on the support arm 5. Upon the outer pipe $M_2$ reaching a position in which it is nearly in contact with the holder 40, the carriage 1 is stopped, the pipe $M_2$ slightly raised by raising the frame 14, and the carriage 1 thereafter slightly moved. The liftable frame 14 is then lowered again, causing the fixed engaging members 45 on the holder 40 to engage in the groove n of the pipe $M_2$ and to support the pipe $M_2$ on the arm 5. Subsequently, detachable engaging members 46 are inserted between the inner and outer pipes $M_1$ and $M_2$, engaged in the groove n of the pipe $M_2$ and secured to the bars 41*b* with bolts and nuts as indicated at 48.

At the other end of the assembly of pipes $M_1$ and $M_2$, spacers 50 for keeping the two pipes spaced apart from each other are arranged therebetween at a plurality of circumferentially spaced locations. The spacers fixedly interconnect the pipes $M_1$ and $M_2$ at the above-mentioned end.

After the second pipe $M_2$ has been fixedly fitted around the first pipe $M_1$, the carriage 1 is retracted. The third pipe $M_3$ and the outermost pipe $M_4$ are thereafter similarly mounted on the support arm 5 by repeating the foregoing procedure. In this way, the pipes $M_1$ and $M_4$ are assembled in a concentric arrangement as fixed together by the holder 40 at one end and by the spacers 50 at the other end. The liftable frames 14 of the carriage 1 are raised to place the nested pipes $M_1$ to $M_4$ on the support rollers 23*a*, 23*b*, and the carriage 1 is thereafter retracted to withdraw the pipe assembly from the support arm 5. The pipe assembly is delivered from the carriage 1 as by a forklift.

During the sequential operation described, each of the pipes $M_2$ to $M_4$ is fitted around the preceding one of the pipes $M_1$ to $M_3$ on the support arm 5 while being supported by the carriage 1, so that the pipes $M_1$ to $M_4$ can be handled without any sliding contact therebetween which would deface the inner surface of the pipe having a mortar lining or seal coating.

Although the pipes $M_1$ to $M_4$ are spaced apart from and secured to one another by the holder 40 and the spacers 50 in the foregoing embodiment, the pipes may be fixed together by the spacers 50 at each end. Further when the pipes $M_1$ to $M_4$ are each provided with a flange f having bolt holes in place of the inner peripheral groove n at the socket end m as seen in FIG. 10, bolt holes formed in the bars 41 may serve as the engaging portions 44 of the holder 40, such that the pipe is secured to the holder 40 by nuts and bolts 51 extending through the bolts holes in the flange f and the bolt holes serving as the engaging portions 44. When the flanges f fit to one another axially of the nested pipes $M_1$ to $M_4$ as illustrated in FIG. 11, distance pieces 52 of required length may preferably be interposed between flange f and the bars 41 to render the flange f free of an objectionable bending force.

The nested pipes, transported to their destination, will be unnested in the following manner. As will be apparent, the pipes can be unnested by performing the foregoing nesting steps in the reverse order. Thus the assembly of pipes $M_1$ to $M_4$ is placed on the support arm 5, then the carriage 1 positioned below the support arm 5, and the liftable frames 14 raised to support the outermost pipe $M_4$ on the support rollers 23*a*, 23*b*. In this state, the spacers 50 interposed between the pipe $M_4$ and the inner pipe $M_3$ are removed, and the corresponding engaging members 46 are removed from the holder 40. After the grooved portion n of the socket end m is disengaged from the corresponding engaging members 45 by slightly raising the liftable frame 14, the pipe $M_4$ is withdrawn by moving the carriage 1 away from the arm 5 and is thereafter removed from the support rollers 23*a*, 23*b* by suitable means. The pipes $M_3$ to $M_1$ are separated in succession by repeating the above procedure.

It will be apparent that when the holder 40 is not used or when the holder shown in FIG. 10 or 11 is used, the nested pipes are separable substantially in the same manner as above only with the exception of minor differences.

The spacers 50 used in the above embodiment will be described below in greater detail with reference to FIGS. 12 to 15. The spacer 50 comprises a hexahedral wood piece 52 serving as a main body and an annular frame 53 of sheet metal fitting around the wood piece. Rubber plates 54, 55 cover a pair of opposed surfaces of the wood piece 52 at right angles to the surfaces surrounded by the frame 53. The rubber plates 54, 55 are fastened to the wood piece 52 with two nails 56. The wood piece 52 thus provided with the frame 53 and the rubber plates 54, 55 is wrapped with a tubular sheet 57. At least one sheet 58 is interposed between the sheet 57 and the rubber plate 54. The sheets 57, 58 which are made of synthetic resin such as polyvinyl chloride, serve to prevent the rubber plates 54, 55 from adhering to the seal coating on the inner surface of the pipe.

A strip 59 for interconnecting a plurality of spacers 50 is provided between the rubber plate 54 and the wood piece 52 and is fastened to the wood piece 52 with the nails 56, with the opposite ends of the tubular sheet 57 secured to the strip 59 with staples 60. A number of the spacers 50 to be arranged in the annular space between the two pipes fitted together over the entire circumference thereof are attached to the strip 59 at specified spacing.

Figure 12:
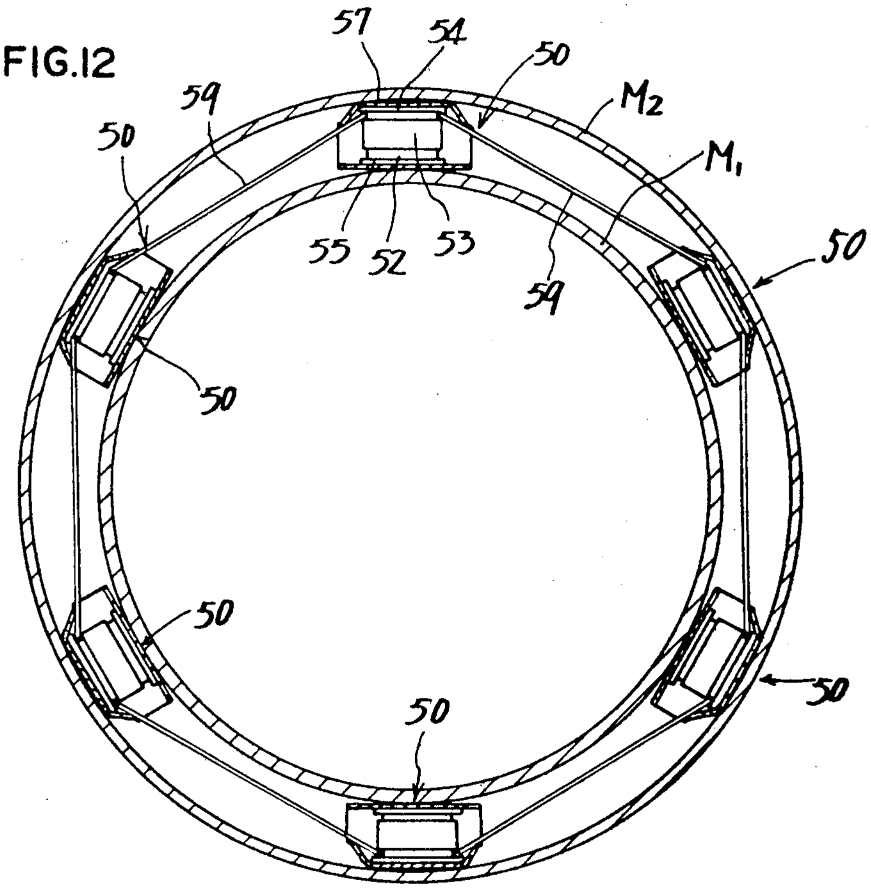
FIG. 12 is a sectional view showing spacers as arranged between pipes.
Figure 13:
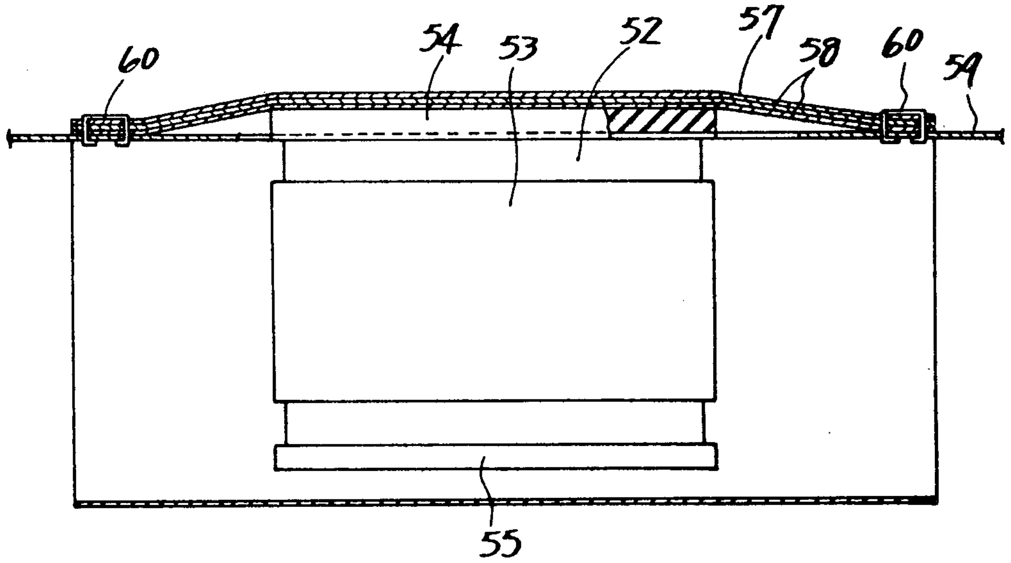
FIG. 13 is a front view partly broken away and showing the spacer.
Figure 14:
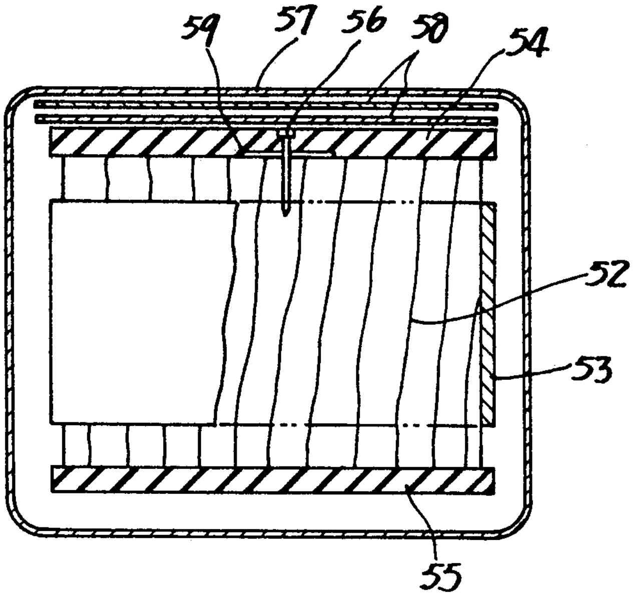
FIG. 14 is a side elevation in vertical section showing the spacer.
Figure 15:
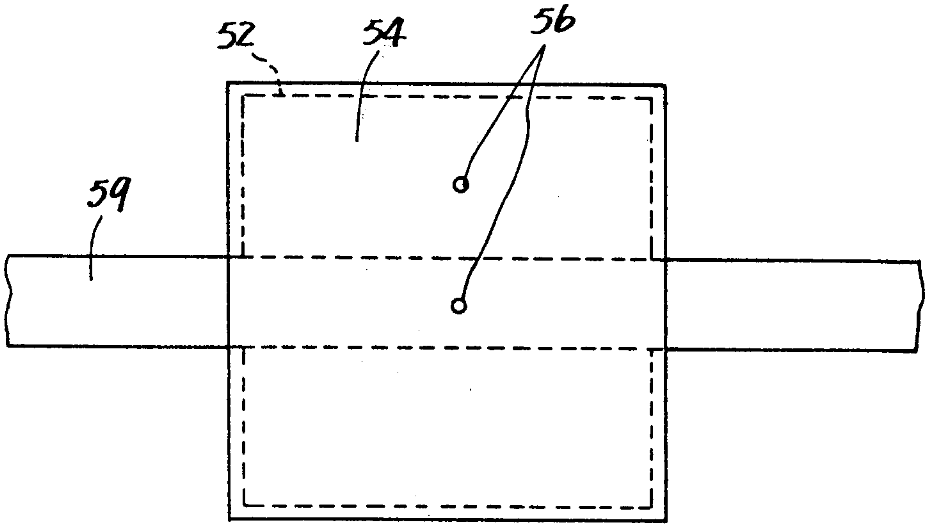
FIG. 15 is a plan view showing the spacer with a sheet removed therefrom.

The spacer unit thus constructed is placed in the annular space between the pipes $M_1$ and $M_2$ fitted together, with the rubber plates 54, 55 of each spacer 50 opposed to the inner and outer surfaces of the pipes $M_2$, $M_1$ as shown in FIG. 12 respectively. After the spacers 50 have been arranged in place, the opposite ends of the strip 59 are connected together. Since the rubber plates 54, 55 are in contact with the inner and outer surfaces of the pipes $M_2$ and $M_1$, the spacer will not damage the mortar lining or seal coating on the inner surface of the pipe $M_2$. The annular frame 53 reinforcing the wood piece 52 imparts increased strength to the spacer 50.

Figure 16:
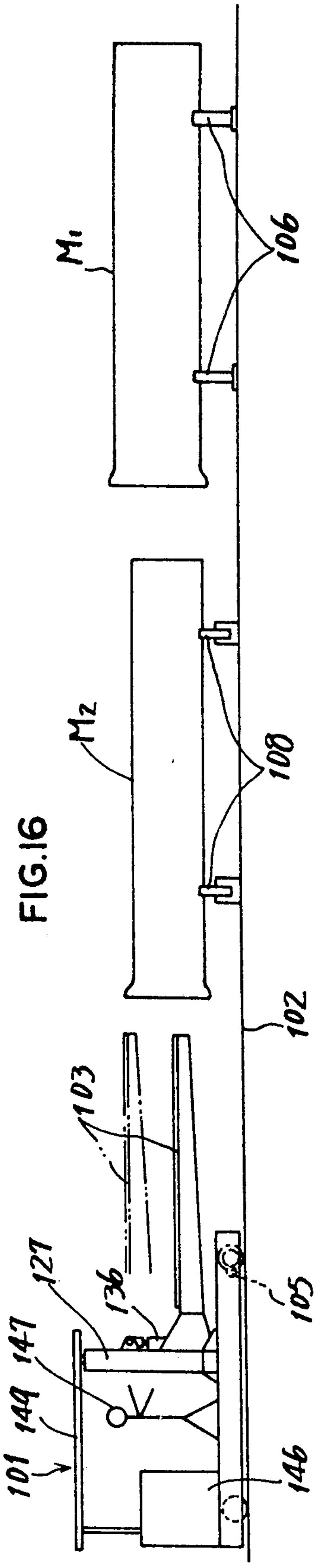
FIG. 16 is a front view showing a second embodiment of the present invention.
Figure 17:
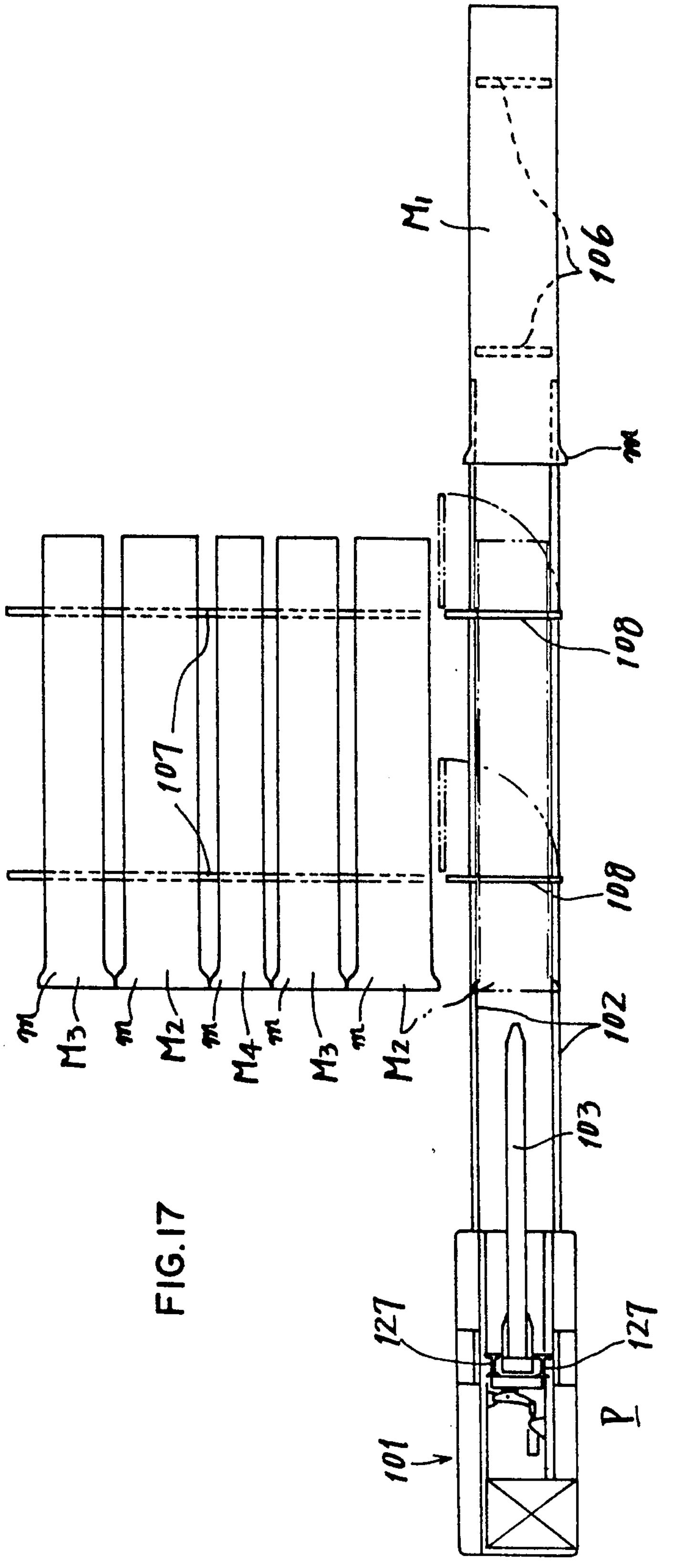
FIG. 17 is a plan view of FIG. 16.

A second embodiment of this invention will be described with reference to FIGS. 16 to 22. FIGS. 16 and 17 show a carriage 101 movable on guide rails 102. The carriage 101 has a forwardly projecting support arm 103 which can be raised or lowered, cylinder means 136 for raising or lowering the support arm 103, and propelling means 105. At one end of the path of travel of the carriage defined by the guide rails 102 are supports 106 by which the pipe $M_1$ of large diameter to be nested as the outermost pipe is supported. The pipe support 106 includes a support member such as a V-shaped block or roller means for supporting the pipe $M_1$ rotatably about its own axis. Arranged at an intermediate position between the pipe supports 106 and a carriage retracted position P at the other end of the path of travel of the carriage defined by the rails 102 are a pair of transfer rails 107 extending at right angles to the rails 102 on one side of the rails 102. The transfer rails 107 serve to transfer the pipes $M_2$ to $M_4$ to be inserted into the pipe $M_1$. Each of the transfer rails 107 is provided at its forward end with a turnable arm 108 serving as a pipe receiving means for supporting pipes $M_2$ to $M_4$ above the guide rails 102. Each arm 108 is horizontally turnable between a position (indicated in a solid line in FIG. 17) above the rails 102 and a side position (indicated in a broken line in FIG. 17).

Figure 22:
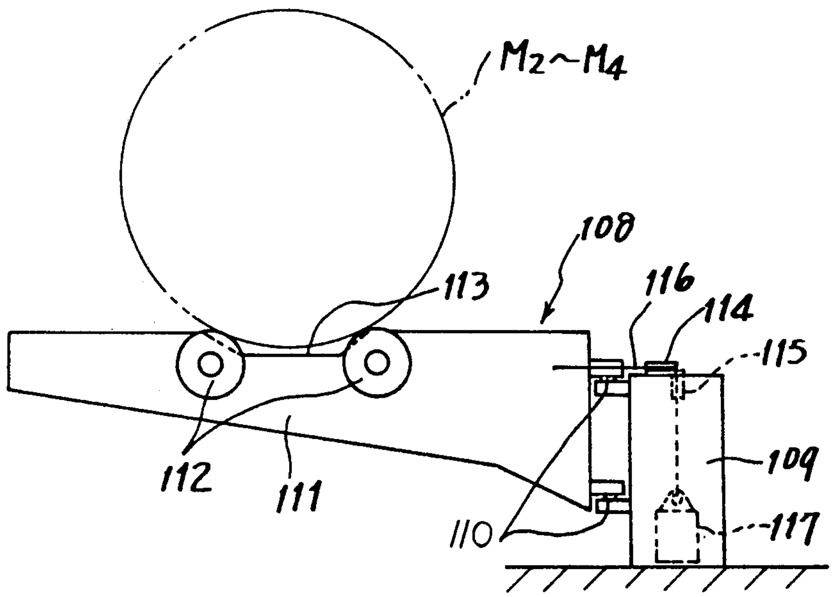
FIG. 22 is a front view showing a turnable arm for receiving a pipe.

As seen in FIG. 22, the turnable arm 108 comprises an arm main body 111 turnably supported by connecting members 110 on a base frame 109 and a pair of support rollers 112 mounted on the main body 111 for supporting the pipes $M_2$ to $M_4$. The arm main body 111 is cut out at its top as at 113. A weight 117 is connected to the arm main body 111 by a rope 116 passed over pulleys 114, 115 on the base frame 109. The arm 108 is urged to its projected position above the rails 102 at all times by the gravity acting on the weight 117.

Figure 18:
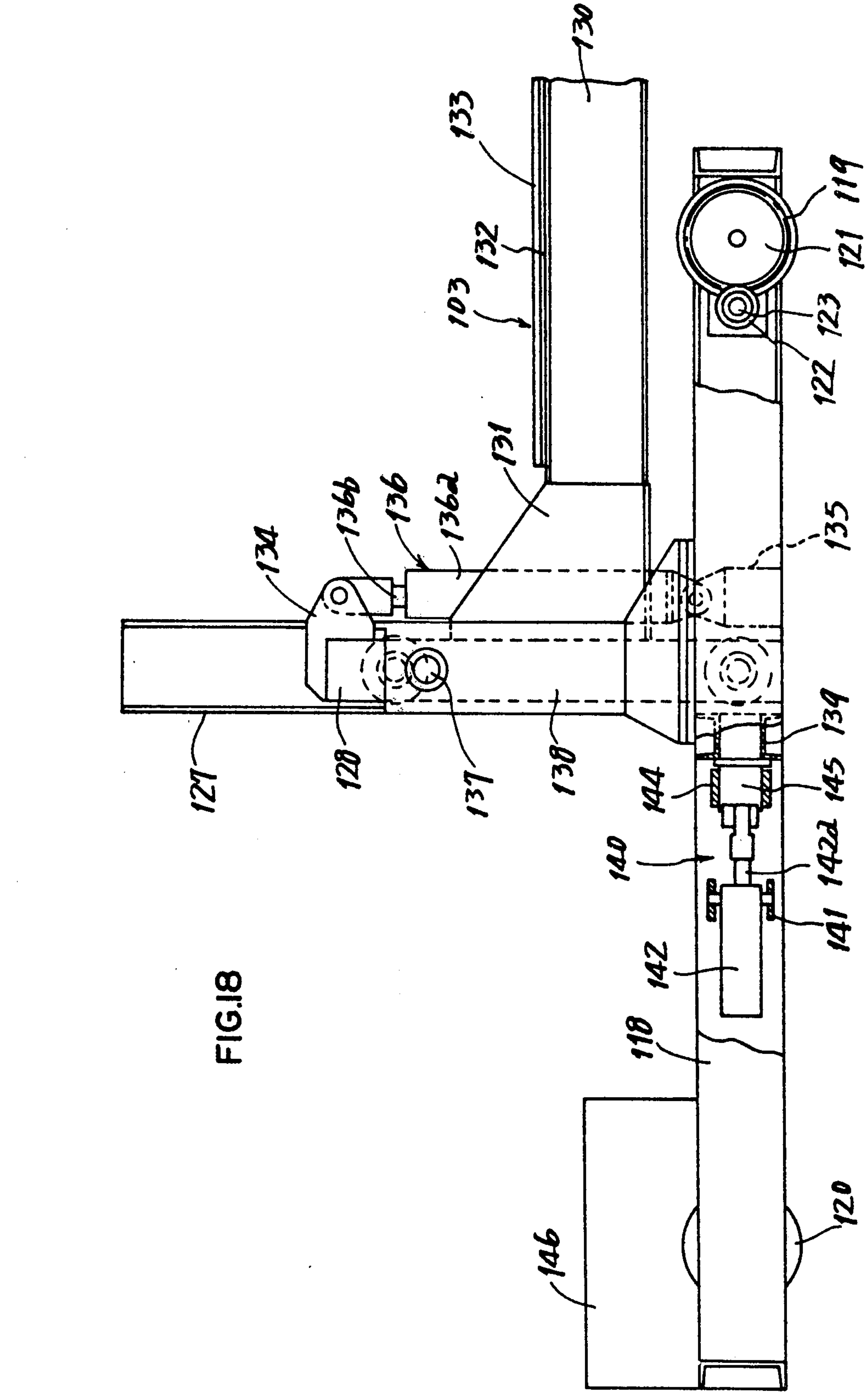
FIG. 18 is a front view showing a carriage.
Figure 19:
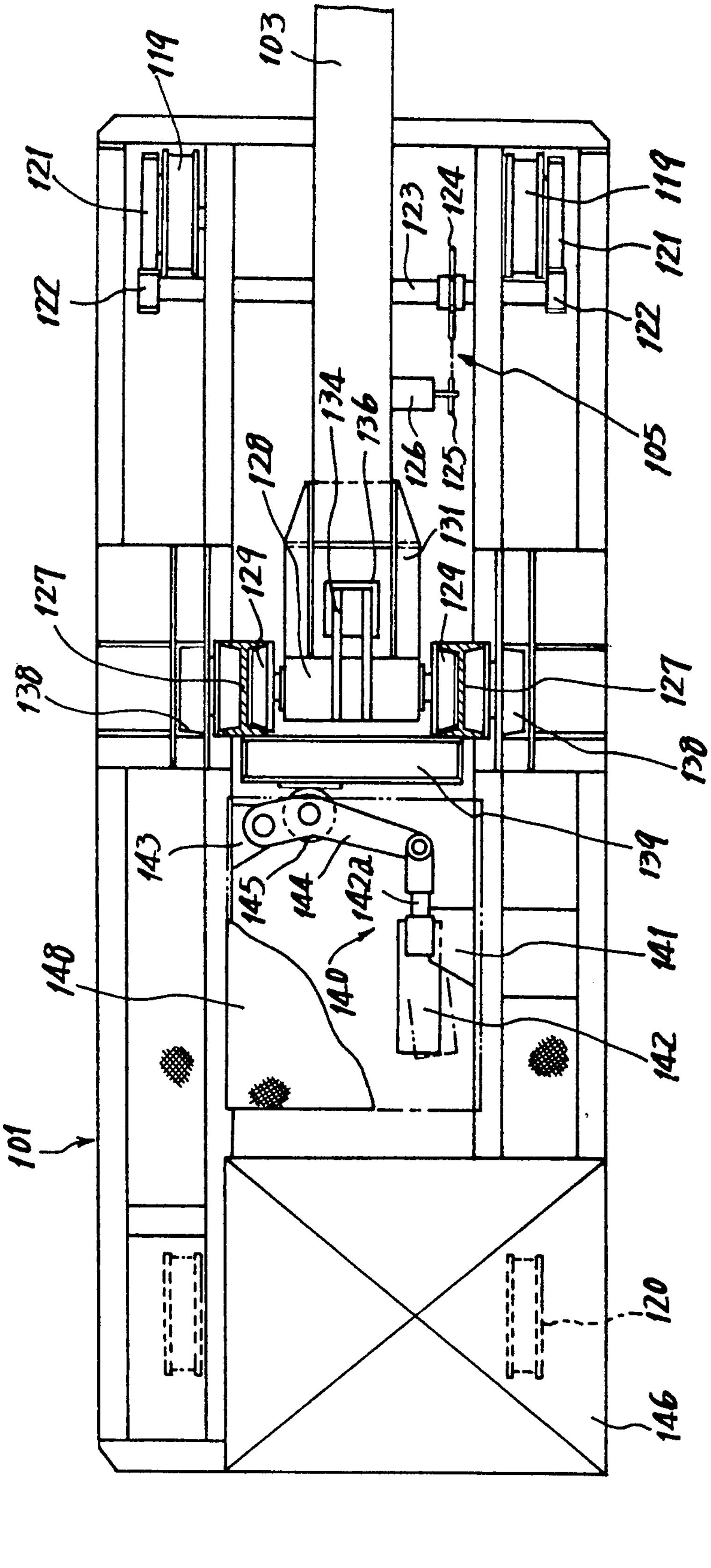
FIG. 19 is a plan view of FIG. 18.
Figure 20:
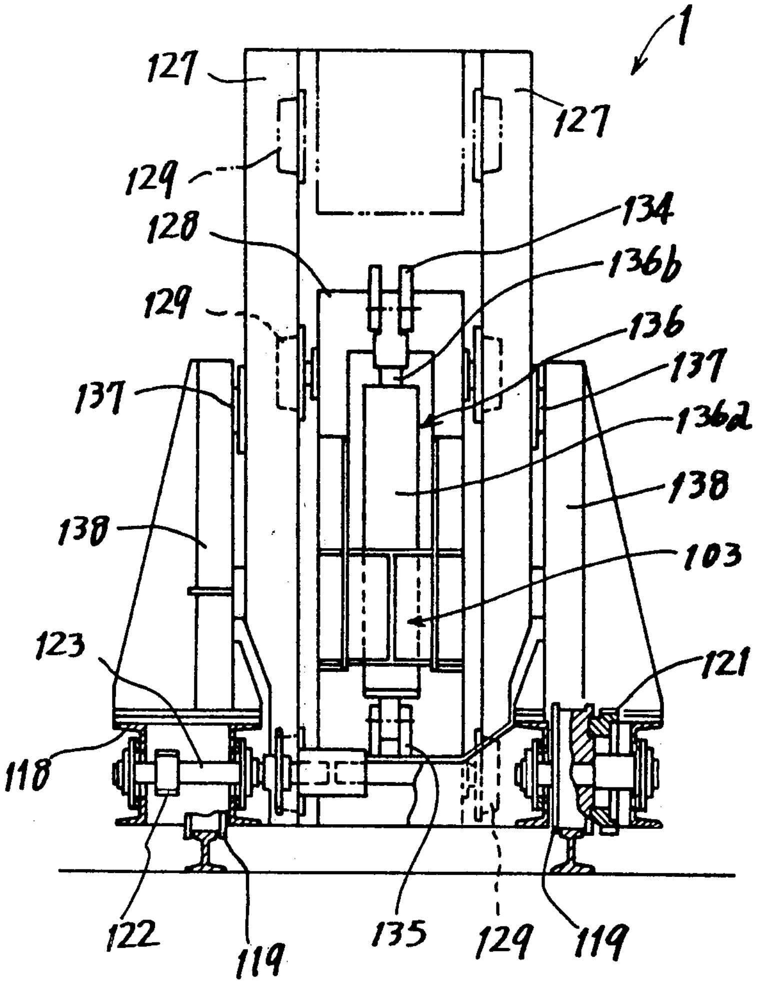
FIG. 20 is a right side elevation of FIG. 18.
Figure 21:
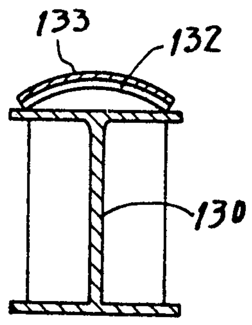
FIG. 21 is a cross sectional view of a support arm.

As shown in FIGS. 18 to 20, the carriage 101 includes a carriage main body 118 comprising a frame of section members and having wheels 119, 120 at its four corners. The opposite front wheels 119 on the carriage 101 fixedly carry gears 121. The propelling means 105 comprises a transmission shaft 123 provided with gears 122 meshing with the gears 121, and a hydraulic motor 126 for delivering torque to the shaft 123 through sprocket wheels 124, 125 and a chain.

Extending upward from the carriage 101 are a pair of I-beam guide frames 127 serving as guide rails. A liftable body 128 fixedly provided with the support arm 103 is supported on the guide frames 127 by rollers 129 mounted on the upper and lower ends of the body 128. The liftable body 128 is vertically movable along the guide frames 127. The support arm 103 comprises a main body 130 made of an I-beam (FIG. 21), a reinforcing member 131 attached to the base end of the main body 130, a top plate 132 of arcuate cross section extending substantially over the entire length of the main body 130, and a rubber plate 133 covering the upper surface of the top plate 132. Cylinder means 136 for raising or lowering the body 128 is provided between and mounted on a bracket 134 at the upper end of the liftable body 128 and another bracket 135 on the carriage main body 118. The piston rod **136*b* and main body 136*a* of the cylinder means 136 are pivoted to the brackets 134 and 135** respectively.

The guide frames 127 are mounted on the carriage main body 118 by the structure to be described below. The frames 127 are provided at an intermediate portion of its length with trunnions 137 by which the frames 127 are tiltably supported on upright posts 138 on the opposite sides of the carriage main body 118. The pair of guide rails providing the frames 127 are interconnected at their lower ends by a beam 139. Disposed in contact with the rear face of the beam 139 is a device 140 for adjusting the horizontal position of the support arm 103.

The adjusting device 140 comprises cylinder means 142 supported by a bracket 141 on the carriage main body 118 and turnable about a vertical pivot, a flexed lever 144 pivoted to the piston rod **142*a* of the cylinder means 142 and to a bracket 143 on the carriage main body 118, and an abutting roller 145 bearing against the interconnecting beam 139. The contraction or expansion of the cylinder device causes the lever 144 and the abutting roller 145 to tilt the guide frames 127, whereby the horizontal position of the support arm 103** is adjustable.

Mounted on the rear end of the carriage main body 118 is a hydraulic unit 146 for feeding working oil to the cylinder means 136, 142 and to the hydraulic motor 126. A cover 148 for supporting the operator thereon is attached to the top of the carriage main body 118. A control panel extends between the posts 138 and is attached to their rear faces. FIG. 16 shows a ceiling 149 on the carriage main body 118.

The second embodiment will be used in the following manner when nesting pipes, for example, in a four-fold arrangement. The pipe $M_1$ to be positioned outermost of the resulting assembly is placed on the pipe supports 106 as by a forklift or the like. The pipes $M_2$ to $M_4$ of three different diameters to be nested in the pipe $M_1$ are arranged in groups on the transfer rails 107 with those of larger diameter in each group positioned closer to the guide rails 102. If the pipes $M_1$ to $M_4$ have socket ends m of increased outside diameter, the pipes are placed with the socket ends m directed to the retracted position P of the carriage 101.

After the pipes $M_1$ to $M_4$ have been thus placed, the foremost pipe $M_2$ on the transfer rails 107 is transferred by rolling onto the turnable arms 108, as indicated in broken line in FIG. 17. Subsequently, the carriage 101 is advanced from its retracted position P to insert the arm 103 on the carriage into the pipe $M_2$ to a predetermined position, whereupon the carriage is stopped. The support arm 103 is raised to lift the pipe $M_2$ with the arm 103 substantially in alignment with the pipe $M_1$ on the supports 106. The carriage 101 is then further advanced to fully insert the pipe $M_2$ on the support arm 103 into the pipe $M_1$, whereupon the carriage 101 is stopped. When advancing, the carriage 101 pushes the turnable arms 108 aside against the gravity acting on the weights 117, holding the arms 108 in contact with the side face of the carriage 101 and in their sidewise position until the carriage 101 retracts. Upon completion of the insertion of the pipe $M_2$ into the pipe $M_1$, the same spacers 50 as already described are provided between the pipes $M_1$ and $M_2$ while adjusting the level of the pipe $M_2$ to fix the pipes to each other. The support arm 103 is then lowered, and the carriage 101 brought back to its retracted position P. The same procedure as above is thereafter repeated for the pipes $M_3$ and $M_4$.

Although the holder 40 used in the first embodiment is not usable during the nesting according to the method described, the holder 40 may be attached to the nested pipe assembly, whereby the pipes $M_1$ to $M_4$ can be held in position against axial displacement relative to one another.

The pipes assembled can be unnested by performing the foregoing steps generally in the reverse order. Stated more specifically, the nested pipes $M_1$ to $M_4$ are placed on the supports 106, the carriage 101 then advanced to insert the support arm 103 into the innermost pipe $M_4$, and the arm 103 thereafter raised to support the pipe $M_4$. In this state, the spacers 50 interposed between the pipes $M_4$ and $M_3$ are removed. Subsequently the carriage 101 is retracted to a position in which the pipe $M_4$ is positioned above the turnable arms 108. The support arm 103 is lowered, causing the turnable arms 108 to support the pipe $M_4$ thereon. The carriage 101 is thereafter brought back to its retracted position P. The pipe $M_4$ is rolled off the arms 108 onto the transfer rails 107. The same procedure as above is thereafter repeated for the pipes $M_3$ and $M_2$ to completely unnest the pipes.

What is claimed is:

1. A pipe nesting apparatus comprising:
a cantilever support arm adapted to be extended through a first pipe and provided with at least two spaced support points arranged on a substantially horizontal line for supporting the first pipe horizontally;
a support member having at least two spaced support points arranged on a substantially horizontal line for supporting a second pipe horizontally thereon, said first and second pipes having transverse dimensions which differ to an extent sufficient to enable one of said pipes to be nested within the other of said pipes;
lift means for vertically moving one of the support elements consisting of said support arm and said support member while maintaining said arrangement of the two support points whereby said first and second pipes can be substantially axially aligned; and
carriage means equipped with one of said support elements for moving said one element in a direction axially of the pipes between a first position in which the support arm and first pipe extend through the second pipe and a second position in which the support arm and the support member are located away from each other.

2. A nesting apparatus as defined in claim 1 wherein the support arm is fixed to a support frame, and the support member is mounted on the carriage means by the lift means.

3. A nesting apparatus as defined in claim 2 wherein a liftable frame is mounted on the carriage means, the support member being mounted on the liftable frame and comprising a pivotable frame extending at right angles to the axis of the pipe and having a pivotably supported one end and the other end supported on the liftable frame so as to be raised or lowered relative to the liftable frame.

4. A nesting apparatus as defined in claim 3 wherein the pivotable frame is provided with a pair of pipe supporting rollers.

5. A nesting apparatus as defined in claim 4 wherein means is provided for rotating one of the pair of rollers.

6. A nesting apparatus as defined in claim 4 wherein a guide member having a V-shaped notch for guiding the path onto the pair of rollers is provided independently of the support member.

7. A nesting apparatus as defined in claim 1 further comprising a holder for engaging and holding a plurality of nested pipes each at one end thereof.

8. A nesting apparatus as defined in claim 7 wherein the holder comprises an annular member surrounding the support arm and a plurality of bars extending radially outward from the annular member, each of the bars being provided with pipe end engaging portions suitably spaced apart longitudinally of the bar.

9. A nesting apparatus as defined in claim 8 wherein cradles are provided at the position of the base end of the support arm for contact with the radially inner ends of the bars provided for the upper half of the pipe.

10. A nesting apparatus ad defined in claim 8 wherein each of the engaging portions comprises an engaging member fittingly engageable in an annular groove formed in the inner surface of the pipe end, the bars for the upper half of the pipe being fixedly provided with the engaging members, the bars for the lower half of the pipe being detachably provided with the engaging members.

11. A nesting apparatus as defined in claim 8 wherein each of the engaging portions comprises a hole formed in the bar and positioned in corresponding relation to a bolt hole formed in the pipe end.

12. A nesting apparatus as defined in claim 7 wherein a cradle of elastic material is provided on the upper half of the support arm close to its forward end for contact with the inner surface of the pipe.

13. A nesting apparatus as defined in claim 1 wherein the support arm is mounted on the carriage means by the lift means, and the support member comprises a stationary support base.

14. A nesting apparatus as defined in claim 13 wherein the support arm is provided on its upper surface with an elastic member for contact with the inner surface of the pipe.

15. A nesting apparatus as defined in claim 13 wherein the support arm extends from a liftable body vertically movable along an upright guide frame on the carriage means.

16. A nesting apparatus as defined in claim 15 wherein the guide frame is supported at an intermediate portion thereof by the carriage means and is pivotally movable in a vertical plane containing the support arm, an abutting member being provided on the carriage means for bearing contact with a side face of the lower end side face of the guide frame opposite to the side face thereof from which the support arm extends.

17. A nesting apparatus as defined in claim 16 wherein the abutting member is movable to an adjusted position in a direction in which the guide frame lower end is pivotally movable.

18. A nesting apparatus as defined in claim 17 wherein the abutting member is mounted on an intermediate portion of a lever having a pivoted one end and the other end connected to means for moving the abutting member in the direction of movement.

19. A nesting apparatus as defined in claim 13 wherein pipe transfer means is provided on one side of the path of travel of the carriage means between the support member and the second position of the carriage means, the transfer means extending at right angles to the path of travel and being provided with pipe receiving means at one end of the transfer means close to the path, the pipe receiving means being movable between a projected position in which it extends across the path and a retracted position beside the path.

20. A nesting apparatus as defined in claim 1 which is provided with spacers to be interposed between nested pipes, each of the spacers comprising a wood piece, an annular metal frame fitting around the wood piece, and contact plates of elastic material attached to a pair of opposed surfaces at right angles to the metal frame fitting surfaces of the wood piece.

21. A method of nesting pipes comprising the steps of:
placing a first pipe of small diameter on a vertically movable support member of a carriage;
moving the carriage to fit the first pipe around a supporting arm;
lowering the support member to cause the arm to support the first pipe thereon;
moving the carriage with a second pipe of larger diameter subsequently placed on the support member thereof to fit the second pipe around the first pipe;

fixing the first and second pipes together by means for spacing said pipes apart from each other;

raising the support member to support the resulting fixed assembly of pipes on the carriage; and moving the carriage away from the position of the supporting arm.

22. A method of nesting pipes comprising the steps of:

placing a first pipe of small diameter in a position between a first position and a second position on the path of travel of carriage means equipped with a vertically movable support arm;

placing a second pipe of larger diameter on a support base located at said second position;

moving the carriage means to insert the support arm into the first pipe;

raising the support arm to support the first pipe thereon;

moving the carriage means to insert the first pipe into the second pipe on the support base; and fixing the two pipes together by means for spacing the pipes apart from each other.

23. A method of nesting pipes as defined in claim 22 further including the steps of:

delivering the first pipe onto pipe receiving means projecting over the path of travel of the carriage means by transfer means disposed on one side of said path between said first and second positions;

supporting the first pipe on the pipe receiving means while the support arm is inserted into the first pipe; and retracting the pipe receiving means from said path after the support arm has been raised to support the first pipe thereon.

24. A method of unnesting pipes comprising the steps of:

a. supporting nested pipes on a support arm;

b. removing spacing and holding means from the space between the outermost of the pipes and an inner pipe immediately adjacent to the outermost pipe while supporting the outermost pipe by a vertically movable support member on carriage means located in a first position below the support arm;

c. removing the outermost pipe from the support member after moving the carriage means from the first position to a second position;

d. moving the carriage means again to the first position below the support arm;

e. raising the support member to support the outermost of the remaining pipes;

and thereafter repeating the above steps b, c, d and e to successively unnest each remaining outermost nested pipe.

25. A method of unnesting pipes comprising the steps of:

a. supporting nested pipes on a support base;

b. inserting a vertically movable support arm of a carriage means into the innermost of the pipes;

c. removing spacing and holding means from the space between the innermost pipe and an outer pipe immediately adjacent to the innermost pipe while supporting the innermost pipe by the support arm;

d. removing the innermost pipe from the support arm after moving the carriage means to withdraw the innermost pipe from said outer pipe;

and thereafter repeating the above steps b, c and d to successively unnest each remaining innermost nested pipe.

26. A method of unnesting pipes as defined in claim 25 wherein said step of removing the innermost pipe from the support arm includes the steps of:

lowering the support arm toward pipe receiving means projecting over the path of travel of the carriage means to cause the pipe receiving means to support the pipe on the support arm;

further moving the carriage means to withdraw the support arm from the pipe;

delivering the pipe from the pipe receiving means onto pipe transfer means on one side of the path of travel of the carriage means;

and thereafter retracting the pipe receiving means from said path of travel.

* * * * *